US012585271B2

(12) United States Patent
Krawiec et al.

(10) Patent No.: US 12,585,271 B2
(45) Date of Patent: Mar. 24, 2026

(54) ACTIVE GEOFENCING SYSTEM AND METHOD FOR SEAMLESS AIRCRAFT OPERATIONS IN ALLOWABLE AIRSPACE REGIONS

(71) Applicant: Rockwell Collins, Inc., Cedar Rapids, IA (US)

(72) Inventors: Bryan M. Krawiec, Ashburn, VA (US); Jason J. Jakusz, Nixa, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 507 days.

(21) Appl. No.: 17/837,594

(22) Filed: Jun. 10, 2022

(65) Prior Publication Data

US 2023/0400852 A1 Dec. 14, 2023

(51) Int. Cl.
G05D 1/00 (2006.01)
B64C 39/02 (2023.01)
(Continued)

(52) U.S. Cl.
CPC ......... G05D 1/0077 (2013.01); B64C 39/024 (2013.01); G05D 1/106 (2019.05);
(Continued)

(58) Field of Classification Search
CPC .. B64C 39/024; G08G 5/0021; G08G 5/0039; G08G 5/006; G08G 5/0069;
(Continued)

(56) References Cited

U.S. PATENT DOCUMENTS 9,466,219 B1 10/2016 Stefani et al.
9,613,536 B1 4/2017 Wolford et al.
(Continued)

FOREIGN PATENT DOCUMENTS

CN 105473408 B * 1/2018 ........ B60W 30/0956
EP 1240636 B1 * 2/2004 ............... G08G 5/80
(Continued)

OTHER PUBLICATIONS

Yanni Kouskoulas, Rosa Wu, Joshua Brul´e, Daniel Genin, Aurora Schmidt and T. J. Machado, Good Fences Make Good Neighbors USing Formally Verified Sage Trajectories to Design a Predictive Geofence Algorithmm, NASA Formal Methods, May 24, 2021, p. 214-230 (Year: 2021).*
(Continued)

*Primary Examiner* — Scott A Browne
*Assistant Examiner* — Nazia Afrin
(74) *Attorney, Agent, or Firm* — Sulter Swantz IP

(57) ABSTRACT

A system and method for integrity monitoring acquire one or more boundaries, each boundary of the one or more boundaries based on at least one fallback action of one or more fallback actions. The system and method receive situational data comprising at least one of environmental data or autonomous vehicle data. The system and method generate, using a monitor module configured to monitor an autonomous vehicle, one or more boundary violation determinations. The system and method generate a fallback status based on at least the one or more boundary violation determinations. The fallback status being configured to correspond to a determination of whether to override a primary control output.

12 Claims, 8 Drawing Sheets

(51) Int. Cl.

| | |
|---|---|
| *G08G 5/21* | (2025.01) |
| *G08G 5/34* | (2025.01) |
| *G08G 5/55* | (2025.01) |
| *G08G 5/57* | (2025.01) |
| *G08G 5/59* | (2025.01) |
| *H04W 4/021* | (2018.01) |

(52) U.S. Cl.
CPC ................. *G08G 5/21* (2025.01); *G08G 5/34* (2025.01); *G08G 5/55* (2025.01); *G08G 5/57* (2025.01); *G08G 5/59* (2025.01); *H04W 4/021* (2013.01); *B64U 2201/10* (2023.01)

(58) Field of Classification Search
CPC . H04W 4/021; B64U 2201/10; G05D 1/0077; G05D 1/106
USPC .............................................................. 701/3
See application file for complete search history.

(56) References Cited

U.S. PATENT DOCUMENTS

| | | | |
|---|---|---|---|
| 9,715,235 | B2 | 7/2017 | McGrew et al. |
| 9,927,807 | B1 | 3/2018 | Ganjoo |
| 10,001,776 | B2 | 6/2018 | Rangarajan |
| 10,032,111 | B1 | 7/2018 | Bertram et al. |
| 10,394,240 | B1 | 8/2019 | Pounds |
| 10,580,310 | B2 | 3/2020 | Cruyningen |
| 10,656,643 | B1 | 5/2020 | Bertram et al. |
| 10,710,602 | B2 | 7/2020 | Goldberg |
| 10,788,325 | B1 | 9/2020 | Lenhardt et al. |
| 10,935,938 | B1 | 3/2021 | Bertram et al. |
| 10,962,972 | B2 | 3/2021 | Koopman et al. |
| 11,042,673 | B1 | 6/2021 | McLean et al. |
| 11,107,001 | B1 | 8/2021 | Bertram et al. |
| 11,175,657 | B1 | 11/2021 | Bloom et al. |
| 11,199,859 | B2 | 12/2021 | Charalambides et al. |
| 2016/0307447 | A1 | 10/2016 | Johnson et al. |
| 2018/0231972 | A1 | 8/2018 | Woon et al. |
| 2018/0255425 | A1* | 9/2018 | Trevathan ............. H04L 67/568 |
| 2019/0088145 | A1 | 3/2019 | Chambers et al. |
| 2019/0361443 | A1* | 11/2019 | Linscott .......... B60W 60/00276 |
| 2020/0066171 | A1* | 2/2020 | Prosser ................... G08G 5/74 |
| 2020/0324899 | A1 | 10/2020 | Geng et al. |
| 2021/0080948 | A1 | 3/2021 | Franco et al. |
| 2021/0375147 | A1* | 12/2021 | Thomassey ............. G08G 5/80 |
| 2021/0380122 | A1 | 12/2021 | Jones et al. |

FOREIGN PATENT DOCUMENTS

| | | | |
|---|---|---|---|
| KR | 20190002740 A | * | 1/2018 |
| WO | WO2019122842 A1 | * | 12/2018 |
| WO | 2021079108 A1 | | 4/2021 |
| WO | WO2021259493 | * | 12/2021 |

OTHER PUBLICATIONS

U.S. Appl. No. 17/684,095, filed Apr. 6, 2022, Krawiec et al.
U.S. Appl. No. 17/704,715, filed Apr. 29, 2022, Papke et al.
U.S. Appl. No. 17/704,793, filed Mar. 31, 2022, Krawiec et al.
U.S. Appl. No. 17/704,838, filed May 3, 2022, Krawiec et al.
Mia Stevens (2019) Geofencing for Small Unmanned Aircraft Systems in Complex Low Altitude Airspace. Thesis: University of Michigan.
Sun, Yuan. 2021. "Autonomous Integrity Monitoring for Relative Navigation of Multiple Unmanned Aerial Vehicles" Remote Sensing 13, No. 8: 1483. https://doi.org/10.3390/rs13081483.

* cited by examiner

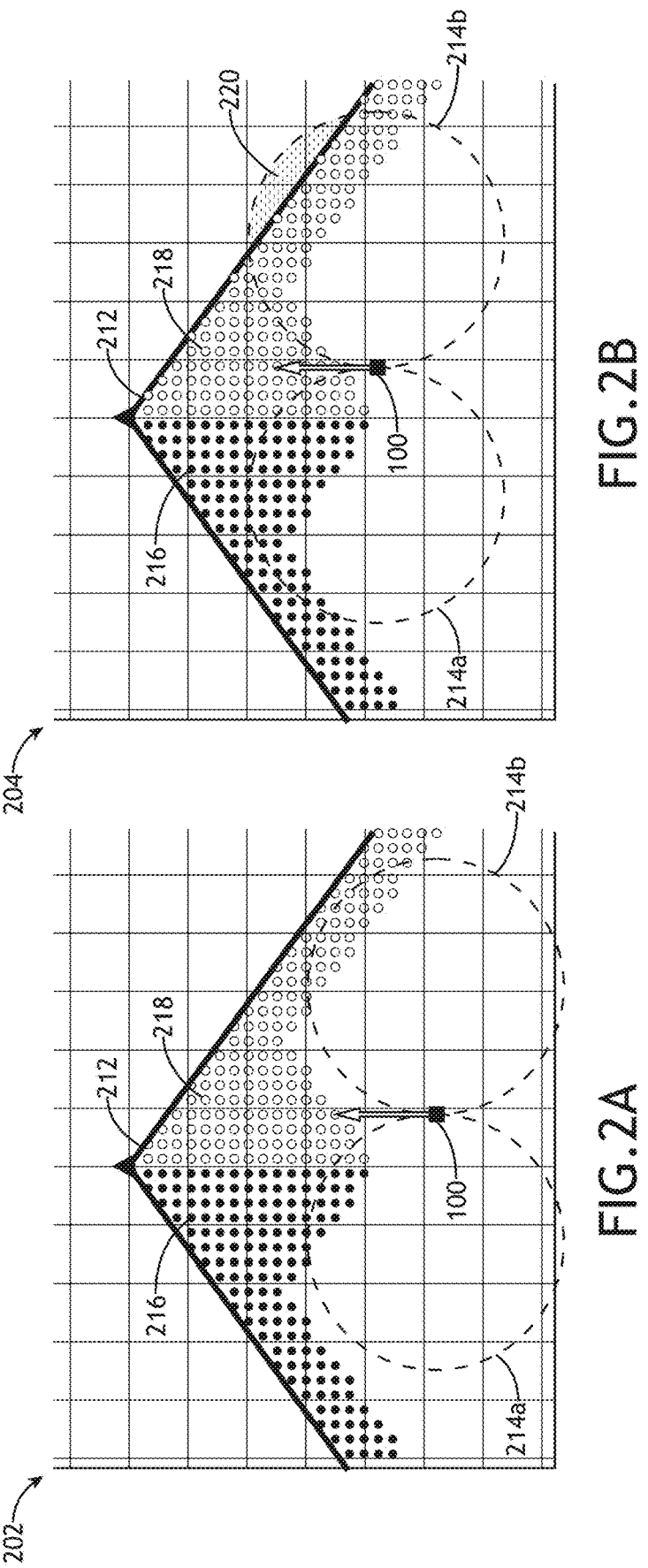

600

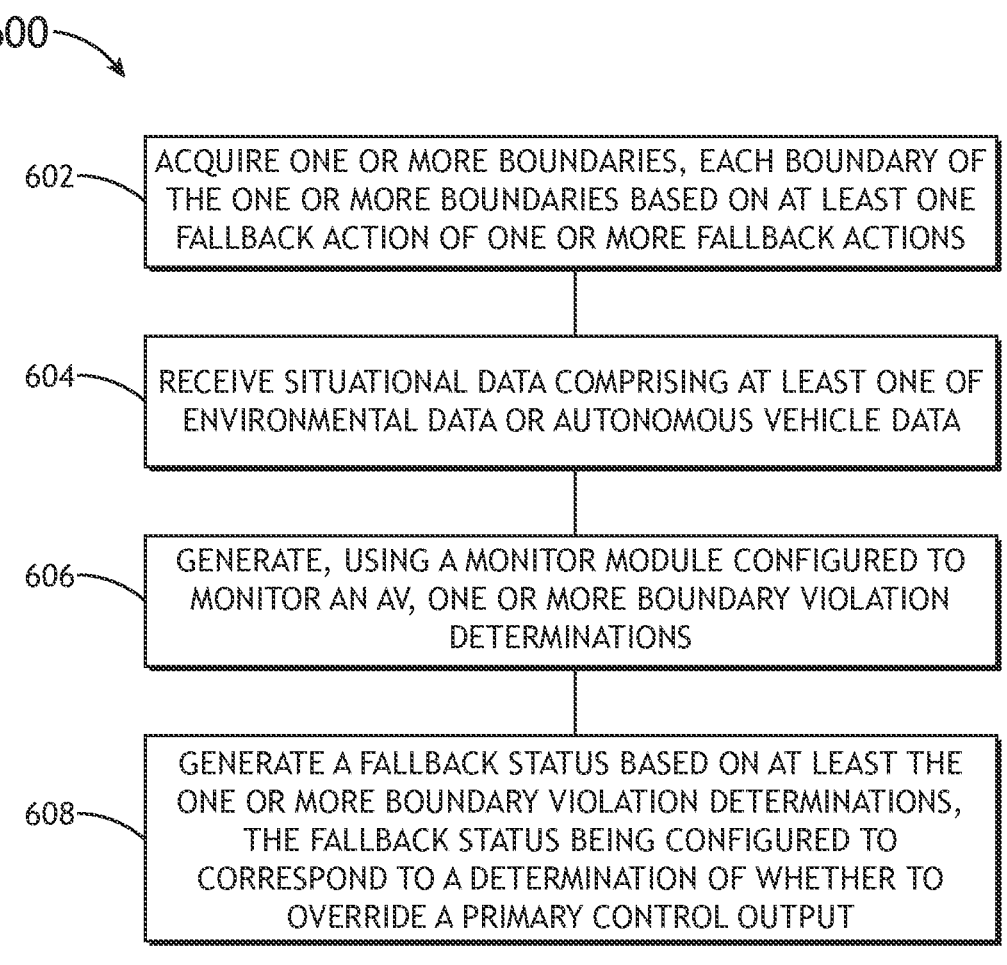

602 — ACQUIRE ONE OR MORE BOUNDARIES, EACH BOUNDARY OF THE ONE OR MORE BOUNDARIES BASED ON AT LEAST ONE FALLBACK ACTION OF ONE OR MORE FALLBACK ACTIONS

604 — RECEIVE SITUATIONAL DATA COMPRISING AT LEAST ONE OF ENVIRONMENTAL DATA OR AUTONOMOUS VEHICLE DATA

606 — GENERATE, USING A MONITOR MODULE CONFIGURED TO MONITOR AN AV, ONE OR MORE BOUNDARY VIOLATION DETERMINATIONS

608 — GENERATE A FALLBACK STATUS BASED ON AT LEAST THE ONE OR MORE BOUNDARY VIOLATION DETERMINATIONS, THE FALLBACK STATUS BEING CONFIGURED TO CORRESPOND TO A DETERMINATION OF WHETHER TO OVERRIDE A PRIMARY CONTROL OUTPUT

FIG.6

ACTIVE GEOFENCING SYSTEM AND METHOD FOR SEAMLESS AIRCRAFT OPERATIONS IN ALLOWABLE AIRSPACE REGIONS

CROSS-REFERENCE TO RELATED APPLICATIONS

The present application hereby incorporates the following applications by reference in their entirety:

U.S. patent application Ser. No. 17/704,838, filed on Mar. 25, 2022, entitled SYSTEM AND METHOD FOR GUIDANCE INTEGRITY MONITORING FOR LOW-INTEGRITY MODULES;

U.S. patent application Ser. No. 17/704,793, filed on Mar. 25, 2022, entitled AUTONOMOUS VEHICLE-BASED MISSION PLANNING AND AUTONOMY SYSTEM FOR MULTI-ASSET COLLABORATIVE OPERATIONS;

U.S. patent application Ser. No. 17/704,715, filed on Mar. 25, 2022, entitled COLLABORATIVE SEARCH MAPPING FOR AUTONOMOUS MULTI-ASSET TEAMS; and U.S. patent application Ser. No. 17/684,095, filed on Mar. 1, 2022, entitled HIGH FIDELITY TEAMMATE STATE ESTIMATION FOR COORDINATED AUTONOMOUS OPERATIONS IN COMMUNICATIONS DENIED ENVIRONMENTS.

TECHNICAL FIELD

The present disclosure relates generally to integrity monitoring, and, more particularly, to integrity monitoring of guidance control of an autonomous vehicle.

BACKGROUND

The capabilities of autonomy modules for autonomous guidance are continuously expanding and contributing to a trend of decreased operator involvement in guidance of autonomous vehicles. Autonomy modules are being employed in situations with ever-increasing complexity, requiring increasing sophistication.

Geofencing involves, by some definitions, defining permissible regions of airspace for aircraft to fly (keep-in geofencing) and restricted zones for aircraft to avoid (keep-out geofencing). However, in commercial products and military flight control systems (e.g., UAVs, guided munitions, etc.), active geofencing functionality that anticipatorily avoids violations of geofencing zones does not seem to be in practical use, at least not commonly.

Some techniques to override autonomous guidance of an autonomous vehicle only override after a geofenced zone perimeter is already crossed or provide operator interfaces for direct autopilot control by a remote pilot. Other techniques carefully analyze the anticipated flight paths that an autonomous vehicle will take during pre-flight to generate waypoints for the aircraft to follow but may be rough approximations. Further, some techniques for accurately simulating flight maneuvers may be too computationally expensive to perform in real time.

SUMMARY

A system and method for integrity monitoring is disclosed. In embodiments, the system and method acquire one or more boundaries, each boundary of the one or more boundaries based on at least one fallback action of one or more fallback actions. In embodiments, the system and method receive situational data comprising at least one of environmental data or autonomous vehicle data. In embodiments, the system and method generate, using a monitor module configured to monitor an autonomous vehicle, one or more boundary violation determinations. In embodiments, the system and method generate a fallback status based on at least the one or more boundary violation determinations. In embodiments, the fallback status is configured to correspond to a determination of whether to override a primary control output.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 2A-4B illustrate various top-down diagrammatic views of an autonomous vehicle with integrity monitoring, in accordance with one or more embodiments of the present disclosure;

FIG. 6 illustrates a flowchart of a method for integrity monitoring, in accordance with one or more embodiments of the present disclosure.

DETAILED DESCRIPTION

Figure 1:
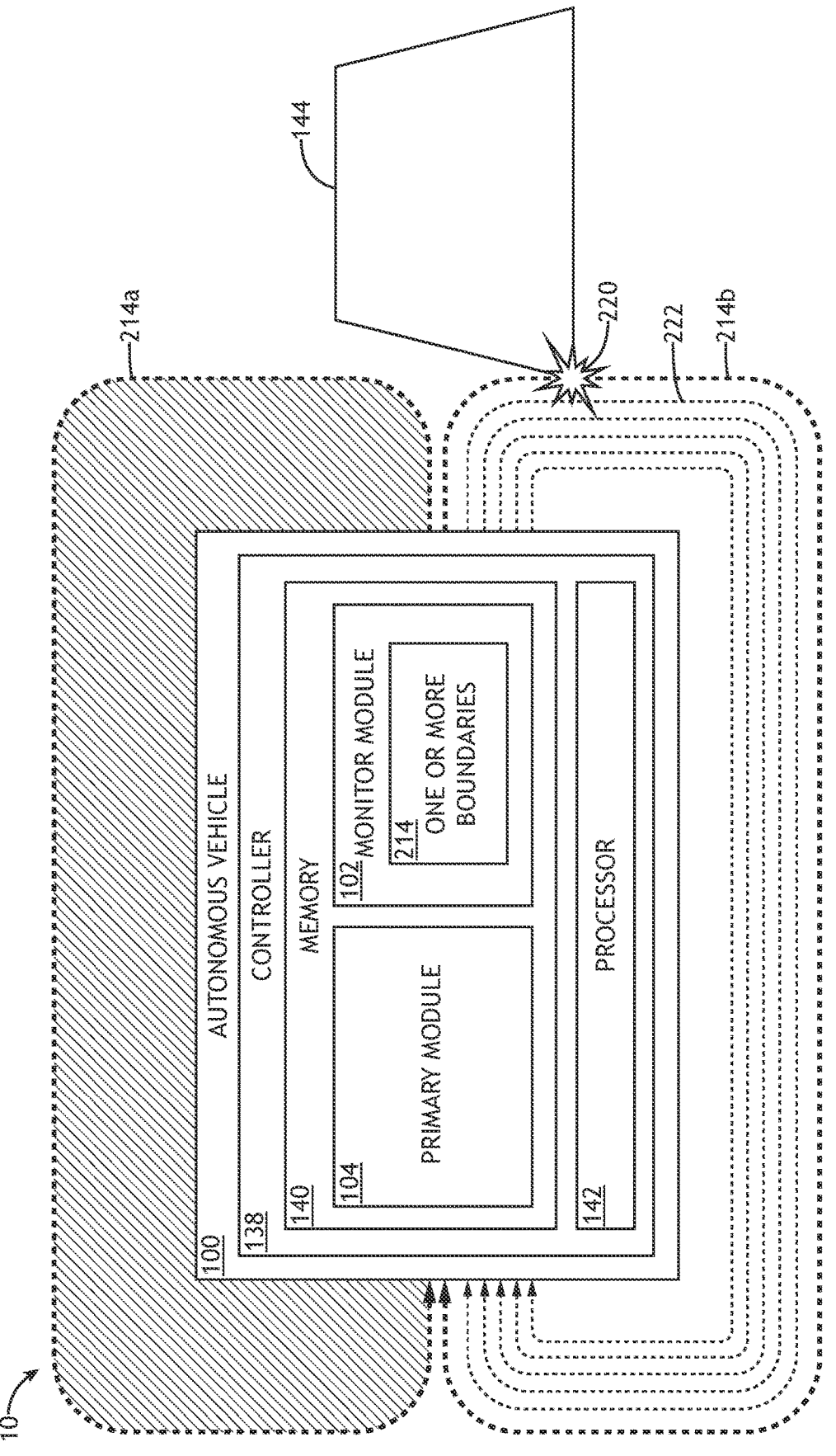
FIG. 1 illustrates a conceptual view of a system for integrity monitoring in the context of a schematic view of one or more boundaries, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, some embodiments of the present disclosure are directed to integrity monitoring based on one or more boundaries (e.g., encapsulating pre-determined simulated trajectories) and determining/generating when to override primary control output (e.g., guidance) of a primary module of an autonomous vehicle (AV) based on the one or more boundaries. It should be noted that the trajectories and/or boundaries may be inflated with margin of safety (i.e., additional margin) to account for errors/uncertainties in simulated trajectories such as navigation system errors, measurement errors, and the like.

For example, a multidimensional dataset (e.g., lookup table) of boundaries may be predetermined/simulated such that one or more boundaries based on parameter values (e.g., velocity) may be dynamically determined (e.g., looked up) in real-time using the dataset for a set of fallback actions (bank left, bank right, dive down, etc.), reducing the computational load of an autonomous vehicle by not needing to perform such simulations in real-time. Further, in some examples, such boundaries may be analyzed for boundary violations (e.g., intersections with objects, zones, and the like) such that a boundary violations is indicative of an inability to perform a particular fallback action (e.g., bank/steer right) associated with such a boundary at such parameter values. For example, an inability may mean an inability to be performed at all and/or performed safely (e.g., without a high risk of collision). In this regard, at least some embodiments of the present disclosure allow for monitoring the available fallback actions an autonomous vehicle may perform at any given moment in time to ensure that there is at least one available fallback action available to perform without resulting in an undesired outcome (e.g., boundary violation, collision). In other words, instead of simulating all possible paths (trajectories) that an autonomous vehicle can make in real time to avoid a violation (perimeter crossing, collision), boundaries (e.g., envelopes, perimeters, ellipses, and/or the like) may be pre-determined (e.g., simulated) and stored in a dataset for quick reference, avoiding the need to perform such simulations dynamically in real time.

In some embodiments, the present disclosure may decouple the concepts of "mission success" and "ensuring safety" through a monitor (e.g., monitor module, high-integrity monitor module) that sits between a primary module (primary autonomy module) and an autopilot of an autonomous vehicle (AV). The monitor may allow the primary module to control the AV as long as no violations (e.g., safety violations, zone entering violations, and the like) are detected (or none are eminent). Further, some embodiments of the present disclosure may be analogous to providing constraints on the primary module so that the primary module cannot control the AV to perform an unsafe action. In addition, such embodiments may allow the AV to not only get high performance through a complex primary autonomy module, but also high integrity and safety through the monitor module. However, in at least some embodiments, the monitor does not guarantee "mission success" (which is up to the primary module), rather the monitor ensures safe operation of the AV.

As mentioned, simulating a set of safe trajectories and boundaries (e.g., using various parameters) can be computationally expensive and/or impossible to perform in real time (e.g., dynamically during a mission/flight) at the degree allowed for by at least some embodiments of the present disclosure. Other integrity monitoring techniques for ensuring an AV does not perform violations (e.g., approaches lacking at least some of the benefits of the present disclosure) include techniques that pre-determine (i.e., before a flight, offline, and the like) a long flight path (e.g., path along the entire route) in an effort to avoid violations (e.g., using GPS routes pre-loaded into the AV). Such pre-determined paths may require relatively large margins of safety to be used (e.g., larger than embodiments of the present disclosure) to ensure a violation does not occur because such a technique does not know what the values of parameters will be in the future to a high degree of certainty. For example, such a technique may need to assume worst case scenarios of parameter values during a mission (e.g., high tailwind speeds, high AV velocity) that may cause the distance/space/area/volume needed for a fallback action to increase (e.g., generally as a vehicle velocity increases, so does braking distance and space needed to perform a bank action, and the like). Further, such a technique does not account for dynamic obstacles (e.g., objects moving in the path and what fallback actions would be available in such a scenario to a high degree of accuracy/simulation). Other drawbacks of such a technique include that the route may be inefficient (e.g., may require the AV to take longer routes around objects/zones due to larger distances/margins of error) and limiting to a primary objective (e.g., a farther distance from a keep-out zone may result in worse resolution in reconnaissance images of the keep-out zone). Other techniques to monitor a violation (e.g., boundary violation) may wait until a violation has already occurred (e.g., a keep-out zone is entered) before issuing a corrective action (e.g., return to base), which may be too late.

At least some embodiments of the present disclosure address the drawbacks, challenges, and the like of other techniques (e.g., those discussed above). For example, at least some embodiments herein allow for an AV that can fly closer to obstacles, zones, and the like without boundary violations (e.g., or reduced risk of boundary violations) compared to other techniques (e.g., at least some of the other techniques described above). Further benefits of at least some embodiments of the present disclosure, compared to other techniques, include one or more of the following benefits: being more computationally efficient; being capable of being performed in real time; being more accurate/precise; being more reliable; and the like.

Other benefits of at least some embodiments of the present disclosure over previous methods include preemptively avoiding (i.e., actively avoiding) undesired events (e.g., crossing perimeter, collisions) by overriding the autonomous primary control or issuing an alert before they occur; providing mission continuity (avoiding unnecessary interruptions by only issuing control or alerts when necessary but otherwise allowing a mission to proceed uninterrupted); and/or being based on integrity aspects such as navigation system error and flight technical error for improved integrity monitoring performance and/or higher confidence boundaries. Further benefits of one or more embodiments of this disclosure include a low-complexity, low-cost system and method that is compatible with a variety of complex, low-integrity, primary autonomy modules to provide increased integrity, assurance, and safety in a manner that is efficient (e.g., computationally) and, in at least some embodiments, provides for real-time integrity monitoring of a variety of fallback actions in a way that approximates computationally intensive operations.

In at least some of the embodiments herein, the monitor module achieves high integrity monitoring, but does not do so by monitoring the guidance commands (e.g., primary control output) of a primary autonomy module itself, but rather monitors a set of boundaries. Generally speaking, the boundaries may conceptually extend from and/or surround the autonomous vehicle in various directions and act as a metric to avoid the occurrence of an undesired event (e.g., entering undesired airspace). Each boundary may encompass one or more simulated trajectories (paths) over one or more values of one or more parameters (e.g., velocity of the AV) such that the boundary defines an area/volume/perimeter of space needed to safely perform the one or more trajectories.

In some embodiments, the primary control output of the primary module may be used to control the AV by simply passing the primary control output through the monitor when appropriate (e.g., safe), otherwise the primary control output may be overridden and a different action may be taken (e.g., an action corresponding to a fallback action, such as a "bank left" maneuver).

In some embodiments, the systems (e.g., system 10) and/or methods herein may be conceptualized in at least three steps (but not necessarily in the following order). First, one or more boundaries are acquired and situational data is received. Second, one or more boundary violation determinations are generated. Third, a fallback status is generated based on the one or more boundary violation determinations. The fallback status may be any data configured to indicate that a primary control output of the AV should be overridden.

Acquiring one or more boundaries, in at least some embodiments, allows for, in a general sense, "monitoring" the integrity (e.g., reliability, predictability, safety) of a primary module (e.g., guidance module that controls an AV) by virtue of the one or more boundaries being analogous to, in some embodiments, one or more safe alternative actions (e.g., last ditch abort actions) that an AV may take to avoid being in an undesired condition (e.g., crashing, being in undesired airspace). In this regard, the monitor module may generate a fallback status analogous to an "override" command/status to ensure that when the one or more boundaries is considered low (e.g., or any other determination which may indicate an undesired condition is eminent), that the primary control output of the primary module (e.g., AV guidance module) is overridden. In other words, when the one or more boundaries (e.g., safe alternative actions) falls below a certain level, a monitor module may cause primary control output of the autonomous vehicle to be overridden. For example, a boundary corresponding to a penultimate "turn right" fallback action may become unavailable/unsafe as an obstacle is approaching, and based on a lack of available safe boundaries, the monitor module may override the primary control output.

FIGS. 1 through 5 generally illustrate a system 10 for integrity monitoring using one or more boundaries 214.

FIG. 1 illustrates a conceptual view of a system 10 for integrity monitoring in the context of a schematic view of one or more boundaries 214, in accordance with one or more embodiments of the present disclosure.

The system 10 may include (or be) an autonomous vehicle (AV) 100. In other embodiments, AV 100 comprises the system 10 or the system 10 is an offboard (remote) system 10 and remotely communicates to AV 100 via one or more wireless communication devices (not shown). The system 10 may include a primary module 104 and a monitor module 102 for integrity monitoring (e.g., of the AV 100). The AV 100 may further include a controller 138, a memory 140, and a processor 142.

In one embodiment, the primary module 104 may be configured to be used to control the AV 100 (e.g., steer, set waypoints, perform any type of action, etc.). In one embodiment, the primary module 104 is unproven. For example, unproven may mean not able to be exhaustively tested. For instance, the primary module 104 may be an unprovable complex autonomy module (e.g., function). The primary module 104 (e.g., primary control module) may include any control module which may receive as input any situational data (e.g., from other modules, from sensors, from wireless communication with any other source of information (e.g., other vehicle, base station, remote sensor, satellite, and the like)). Control modules (e.g., primary control modules, which may be unproven) at multiple levels of planning (e.g., team-level, asset-level, and the like) are generally discussed in U.S. patent application Ser. No. 17/704,793, filed on Mar. 25, 2022, entitled AUTONOMOUS VEHICLE-BASED MISSION PLANNING AND AUTONOMY SYSTEM FOR MULTI-ASSET COLLABORATIVE OPERATIONS, which is herein incorporated by reference in the entirety. Situational data exchange between assets of a team of assets is discussed in U.S. patent application Ser. No. 17/704,715, filed on Mar. 25, 2022, entitled COLLABORATIVE SEARCH MAPPING FOR AUTONOMOUS MULTI-ASSET TEAMS, which is herein incorporated by reference in the entirety. Situational data exchange of teammate state estimation is discussed in U.S. patent application Ser. No. 17/684,095, filed on Mar. 1, 2022, entitled HIGH FIDELITY TEAMMATE STATE ESTIMATION FOR COORDINATED AUTONOMOUS OPERATIONS IN COMMUNICATIONS DENIED ENVIRONMENTS, which is herein incorporated by reference in the entirety.

Fallback actions, safety margin determinations, and overriding a primary control output with a safe guidance control output are described generally in U.S. patent application Ser. No. 17/704,838, filed on Mar. 25, 2022, entitled SYSTEM AND METHOD FOR GUIDANCE INTEGRITY MONITORING FOR LOW-INTEGRITY MODULES, which is incorporated herein by reference in its entirety.

The monitor module 102 may acquire (and/or generate) one or more boundaries 214 (e.g., but not limited to, a maximum bank left boundary 214a, and a maximum bank right boundary 214b as shown in FIG. 1). Although only two boundaries 214 are shown in FIG. 1, the one or more boundaries 214 may be any number and/or any type (or multiple types) of boundaries corresponding to any scope of actions (or multiple scopes) (e.g., high level actions such as a "abort mission" action, medium level "turn left" actions, low/detailed level set of time-series of one or more specific actuator controls for performing a specific action such as a maneuver). Similarly, any control output, guidance command, boundary, and the like of this disclosure may likewise, unless otherwise noted, be (or correspond to) any type of control output (or action) and/or be within any scope.

In one example, the boundaries 214 are pre-determined (e.g., simulated before a mission starts, offline, on a computer cluster, days ahead of time, and/or the like). For instance, boundaries 214 may correspond to a list/set of some or all of the possible actions (e.g., maneuvers, fallback actions, and the like) that the AV 100 or system 10 is capable of performing.

In some embodiments a dataset (not shown) includes the boundaries 214. For example, the dataset may be a lookup table. For example, the dataset may be a multi-dimensional and/or pre-determined lookup table. For example, in some embodiments, the dataset is generated based on simulations (e.g., computer simulations—but it should be noted that simulations may also include being based on historical data and extrapolation/interpolation) such that the dataset may be used to quickly look up a specific boundary 214 (e.g., specific boundary profile/shape) for a given parameter (or set of parameters) for a specific fallback action (or set of fallback actions, such as all fallback actions, certain types of fallback actions, and/or a specific types of fallback actions). In this regard, the dataset may be used to lookup one or more boundaries 214 using one or more parameters. In one example, a specific type of fallback action may be any fallback action that corresponds to the AV 100 going in a right-side direction (e.g., relative to a straight forward heading). In this regard, the boundary may encompass all fallback actions that can be used to avoid an obstacle that is located on the left side of the AV 100.

The boundaries 214 may be any boundary, trajectory, shape, shape encompassing multiple trajectories, perimeter, perimeter with added margin of safety, and/or the like. For example, the boundary may be data stored on memory 140 that is in any form useful to define a boundary (e.g., but not limited to, a 2-dimensional perimeter/area and/or a 3-dimensional perimeter/volume; a path fit to a function; a set of points, a mesh, a topology, and/or the like; a diameter value corresponding to an area or perimeter of a circle; values defining an ellipse, polygon, and/or the like; and/or the like). For example, such perimeters may define an area (e.g., in a 2-dimensional coordinate system) and/or a volume (e.g., in a 3-dimensional coordinate system) that corresponds to simulated trajectories (i.e., paths) of an AV 100. For instance, such a boundary 214 may be a space needed to perform (e.g., and/or safely perform with added margin) a particular fallback action, a trajectory, a set of trajectories, and/or the like. In this regard, if no obstacles (or undesired zones) are intersecting with a space/perimeter defined by the boundary 214, then the boundary 214 may be indicative of a fallback action that may be safely performed without causing a violation.

In one example, such a boundary 214 corresponds to a set of trajectories 222 for a particular fallback action over a range of parameter values of a single parameter. In another example, such a boundary 214 corresponds to a set of trajectories 222 for a particular fallback action over multiple ranges and parameters, one range for each parameter. In another example, such a boundary 214 corresponds to multiple types of fallback actions over a set of range of parameter values. For example, one large boundary 214 may define an area/volume needed to safely perform, alternatively, a maximum (i.e., max) bank right fallback action (over a range of velocity values and bank angles) and a max bank left fallback action (over a range of velocity values and bank angles). In this regard, a single boundary may indicate the area/volume needed to perform multiple fallback actions over a range of velocity values and bank angles such that if no boundary violation determination (e.g., violation) is generated for that boundary, it may, in some embodiments, be assumed that any one of the fallback actions at any of the parameter values may be performed without causing a violation.

For instance, in one nonlimiting illustrative example, the following set of steps may occur. A dataset may be generated based on a set of simulations. The simulations may vary values of a set of parameters (e.g., velocity, bank angle of an AV) over a range (e.g., one range for each parameter) in order to determine/generate a set of simulated AV paths (trajectories 222 as shown in FIG. 1). For example, velocity may be varied from 10 to 90 m/s (e.g., in any increment, such as 1 m/s increments) and bank angle may be a roll angle of a maximum bank maneuver measured relative to an axis parallel to a straight-forward trajectory of the AV 100) that varies from 0 to plus and minus 90 degrees (or any other range such as plus and minus 45 degrees) in any increment (e.g., 1-degree increments) in a specific direction (e.g., left or right). For example, a right maximum bank angle at a value of plus 89 degrees may be similar to a maximum "pull upwards" aircraft fallback action (e.g., to go over an obstacle), but angled slightly to the right side by 1 degree. In this example, the simulations may approximate all possible paths of the AV 100 over such a range of parameter values for a right-side maximum bank maneuver boundary. In this example, such a boundary 214b may be, but is not limited to, a 3-dimensional boundary such that the boundary 214b defines a volume. Such a volume may be configured to include/contain all of the simulated trajectories 222 (as shown) of all of the values of the parameters for banking right. For example, various trajectories 222 may be concentric, intersect, be different, and/or the like as various parameter values are changed. For example, as shown in FIG. 1 an outer trajectory (not labeled—but equal to the right turn boundary 214b) may be the largest trajectory 222 needed for the largest velocity (e.g., 90 m/s) at a zero degree maximum right bank angle. The smallest trajectory 222 shown in FIG. 1 may be the trajectory needed for the smallest velocity (e.g., 10 m/s) at a zero degree maximum right bank angle. In some embodiments, a conceptual intersection/collision (e.g., boundary violation 220 determination of FIG. 1) of a boundary with an external perimeter/object/zone may indicate that a fallback action corresponding to such a boundary 214 is no longer available to be performed (e.g., performed without a collision, safely performed, or the like).

Note that the above example is not limiting and the boundaries 214 may correspond to (e.g., contain trajectories 222 corresponding to) any value (and/or range) of any number or type of parameters. Further, each boundary 214 may represent a range of values for a parameter and/or a specific value of a parameter. For example, a single boundary 214 may represent a range of values of a parameter (as is described in the above example for the range of velocity and bank angle values) and/or a set of boundaries 214 may represent such ranges. For example, a single boundary may represent the range of bank angles described above, but for a single velocity value (e.g., 20 m/s), and such a boundary may be of a set of boundaries 214 representing the range of velocity values (e.g., in the increments described above). Further, a boundary may be specific to both a specific first parameter value and a specific second parameter value such that many boundaries 214 are needed to represent every possible value of each parameter (e.g., a multiple of the number of possible values of each parameter). In this regard, each parameter may be dynamically referenced (e.g., during a dataset lookup step of a method) in terms of acquiring a corresponding boundary 214 for a particular type of fallback action. Note that not all parameters need to necessarily correspond to a single, specific boundary 214, and a boundary 214 may correspond to any value, range, and/or a portion of a range of any parameter or set of parameters. In this regard, a single, specific boundary 214 may represent/contain one or more trajectories 222 corresponding to one or more simulations of a value, range of values, or portion of range of values of one or more parameters (as shown for multiple trajectories 222 contained within boundary 214b in FIG. 1).

In some embodiments, for example, the right bank boundary 214a of FIGS. 2A-2D is acquired/acquirable from a dataset based on a velocity value of 50 m/s and a right bank angle of 0 degrees. Also note that a dataset may be multi-dimensional in the sense that a fallback action itself may be a dimension of the dataset such that one fallback action (e.g., a first dimension) and one parameter (e.g., a second dimension) may cause the dataset to be multi-dimensional.

In some embodiments, the set of fallback actions is two or more fallback actions or any other number of fallback actions. In one embodiment, at least one fallback action of the set of fallback actions comprises at least one of: a turn circle, a Bezier curve, a timeseries of guidance commands, or a timeseries of actuator commands.

Referring now to the AV 100, the AV 100 may comprise aerial, land, or sea vehicles. For example, the AV 100 may comprise one or more unmanned aerial vehicles (UAVs) or drones. The AV 100 may perform one or more mission tasks/objectives. Tasks include, but are not limited to, search and rescue, pipeline surveillance, reconnaissance, mapping, and extending networked communications. For example, the AV 100 may travel to a location of an objective via default navigation trajectories, and perform additional mission tasks at the shared objective. The AV 100 may encounter non-objective obstacles 144. Obstacles may be defined by perimeters 212. The obstacles 144 may comprise, but are not limited to general obstacles (buildings, towers, bridges, dams, peer AVs, other vehicles, etc.), zones (keep-in zones, keep-out zones, and other zones definable by GPS coordinates), terrain (mountains, hills, canyons, valleys, rocks, etc.), adversarial threats (e.g., military structures, vehicles, weapons, etc.), weather (e.g., thunderstorms, hurricanes, fog, ice, snow, rain, winds, etc.), and the like.

In some embodiments, an AV 100 is a vehicle that is fully autonomous (e.g., UAV) such that a user of the AV 100 is remote from the AV 100; but, in some embodiments, the user may be still capable of providing some remote feedback/control. In other embodiments, the AV 100 is a vehicle with autonomous capabilities (e.g., performs one or more tasks via a primary module 104 mainly or completely autonomously) but the vehicle may be capable of simultaneously having a user (e.g., human pilot, overseer) in the vehicle during operation such that the user may provide input (e.g., drive/fly the vehicle, decide tasks, and/or takeover) if desired. In this regard, the user may provide an extra dimension of integrity monitoring. In some embodiments, the user may select a mission task for the AV 100. For example, the primary module 104 may be a complex autonomy module configured to achieve objectives corresponding to high level mission level coordination and/or vehicle level action planning.

It should be that in at least some embodiments, an AV 100 is not limited to an unmanned vehicle, but may include a manned vehicle as well. For example, the meaning of "autonomous", "autonomy", and the like may include the operation of manned and unmanned vehicles when such systems are being actively controlled by an embedded AV subsystem, where fallback control (i.e., overriding a primary control module) is handled by the AV subsystem (e.g., the AV 100 does not rely on an operator/human to assume control in the event of a failure of the primary control module). However, in other examples, an operator/human may be relied upon to assume fallback control (override), with the primary control module (autonomously/automatically) providing controls to maneuver an AV (generally).

Referring now to the controller 138, the processor (e.g., processing circuit) 142 includes at least one processor 142, which may be any type of general purpose or special purpose processor (e.g., FPGA, CPLD, ASIC, etc.), and at least one memory 140, which may be any type of computer or machine-readable storage medium (e.g., ROM, RAM, hard disk, flash memory, etc.). The processing circuit 142 may be paired with or a component of a communication link, such as via a networking interface (e.g., Ethernet).

The memory 140 may include one or more modules including instructions that may be executed by processing circuit 142 to perform various processing modules and/or provide various output (e.g., data, guidance control) for the system 10.

It should be noted that, in some embodiments, due to a safety criticality of the monitor module 102, the monitor module 102 is run on a real-time operating system (RTOS) on a high-integrity computing platform (e.g., both hardware and operating system). Further, in some embodiments, the monitor module 102 may be a high priority module and/or may be configured to have priority when executing on a controller 138. For example, monitor module 102 may be configured to at least one of: have priority, not be resource starved, partitioned from non-safety critical software/modules, or the like.

As mentioned, the system 10 may include a monitor module 102. In some embodiments, the monitor module 102 may receive (at least some portion of) situational data (which is not necessarily a part of system 10) (e.g., as input for various elements and outputs of monitor module 102, and the like). Likewise, the primary module 104 of the system may receive as input data at least some of situational data. The situational data may include environmental data and AV data. For example, situational data may include data of, but not limited to, any sensor, data source, other vehicle, or the like that is related to the environment relevant to the AV 100, or data relevant to the AV 100 itself. For example, environmental data may include, but is not limited to, maps, radar sensor data, lidar sensor data, data of locations of obstacles (e.g., other vehicles), mission/task data of other vehicles, and/or any other data not categorized as closely related to the AV 100 itself and its own behaviors. AV data may include any data closely related to the AV 100 and its own behaviors such as, but not limited to, location of the AV 100, distance of the AV 100 to obstacles, size of the AV 100, fuel remaining of the AV 100, and/or data (e.g., sensor data) related to performance, velocity, altitude, mission/task data of the AV, control output of the AV, and/or health of AV systems, or the like.

The primary control output (e.g., nominal command control output) of primary module 104 (e.g., generated by primary module 104) may be configured to be used to control the AV 100 (e.g., steer, set waypoints, perform any type of action, etc.).

In some embodiments, the monitor module 102 receives the primary control output (e.g., as input for various elements and outputs of monitor module 102, and the like). In this regard, the monitor module 102 may be used to monitor (e.g., filter) the primary control output, and, in a sense, pass the primary control output through, or override, when desired. In this regard, generally, the monitor module 102 may be "aware" of the primary control output being performed or planning to be performed by the AV 100. Primary module 104 may output the primary control output that includes at least one of waypoints, guidance commands, or inner loop commands. In one example, guidance commands include at least one of airspeed, heading, altitude, or vertical speed. In another example, inner loop commands include at least one of pitch or bank.

In another embodiment, the monitor module 102 includes one or more sub-monitors (not shown). The one or more sub-monitors may include any number and type of sub-monitors. In one illustrative example, each sub-monitor may generally be used to monitor one or more safety margins (e.g., corresponding to constraints, risks, and/or considerations) of the AV 100 in relation to a particular fallback action of the set of fallback actions. One or more sub-monitors may also be used to monitor the one or more boundaries 214. For example, some embodiments of the present disclosure use a boundary violation determination sub-monitor to generate when a boundary is violated (e.g., intersected). In at least some examples, each boundary is input into (e.g., processed by, received by, and the like) each sub-monitor of the one or more sub-monitors.

FIGS. 2A-2D illustrate top-down diagrammatic views 202, 204, 206, 208 of an AV 100 heading north (e.g., up direction of the views) with integrity monitoring in the context of a keep-in zone, in accordance with one or more embodiments of the present disclosure. The AV 100 is shown heading in various directions illustrated as a short black line extending out from the AV 100. Boundaries (e.g., a maximum bank left boundary 214a, and a maximum bank right boundary 214b) are visualized extended out from the AV 100. Perimeter 212 may be any obstacle 144 or perimeter (e.g., keep-in zone perimeter, keep-out zone perimeter, and the like). Left violation locations 216 are visualizations of locations where the system 10 generates an alert and take a maximum bank right fallback action and right violation locations 218 are visualizations of locations where the system 10 generates an alert and takes a maximum bank left fallback action when the AV 100 is heading parallel to the direction the AV 100 is shown heading in.

In FIG. 2A the AV 100 is sufficiently far from the perimeter 212 such that neither of its escape action paths (e.g., boundaries 214a, 214b) are impeded.

In FIG. 2B the AV 100 takes no escape action because while the right boundary 214b is blocked (e.g., resulting in a boundary violation 220 determination), the left boundary 214a is not blocked (e.g., which does not result in a boundary violation 220 determination—i.e., the AV 100 still has a fallback action available to perform.

Note that hashed area of intersection 220 of tight boundary 214b and perimeter 212 is illustrative of a boundary violation 220 (e.g., such that a boundary violation determination is generated as a result of a such a boundary violation 220). For example, using situational data (e.g., radar emanating from an object 212, pre-determined zone perimeter maps and positional/GPS data of the AV 100, etc.), the location of the AV 100 relative to the perimeter 212 may be determined and used to calculate whether a boundary 214 intersects with a perimeter 212.

Figures 2C, 2D:
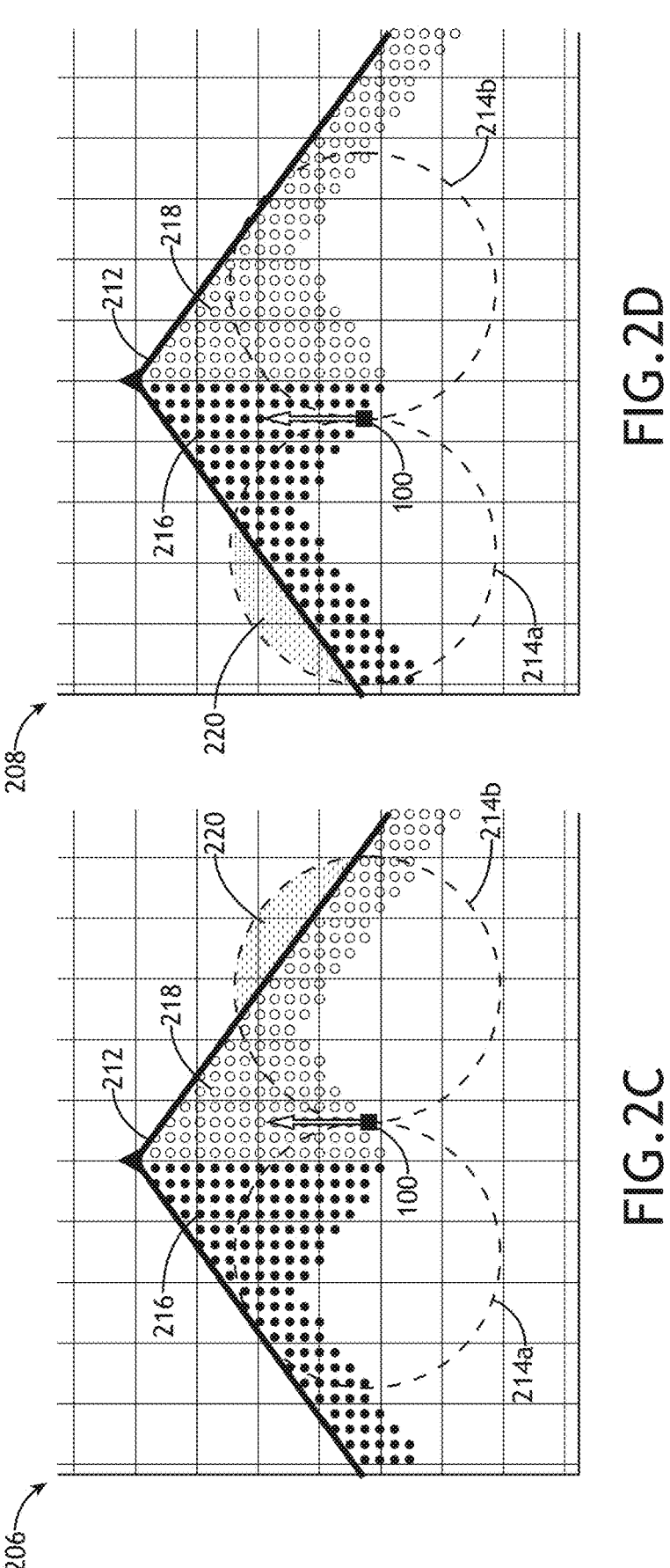

In FIG. 2C the AV 100 takes a maximum bank left fallback action associated with the maximum bank left boundary 214a since a boundary violation determination has just been generated for the last remaining fallback action (i.e., the maximum bank left fallback action). In FIG. 2C, the right boundary 214b is blocked.

In FIG. 2D, similar to 2C, the AV 100 takes a maximum bank right fallback action associated with the maximum bank right boundary 214b since a boundary violation determination has just been generated for the last remaining fallback action (i.e., the maximum bank right fallback action). In FIG. 2D, the left boundary 214a is blocked.

Figures 3A, 3B:
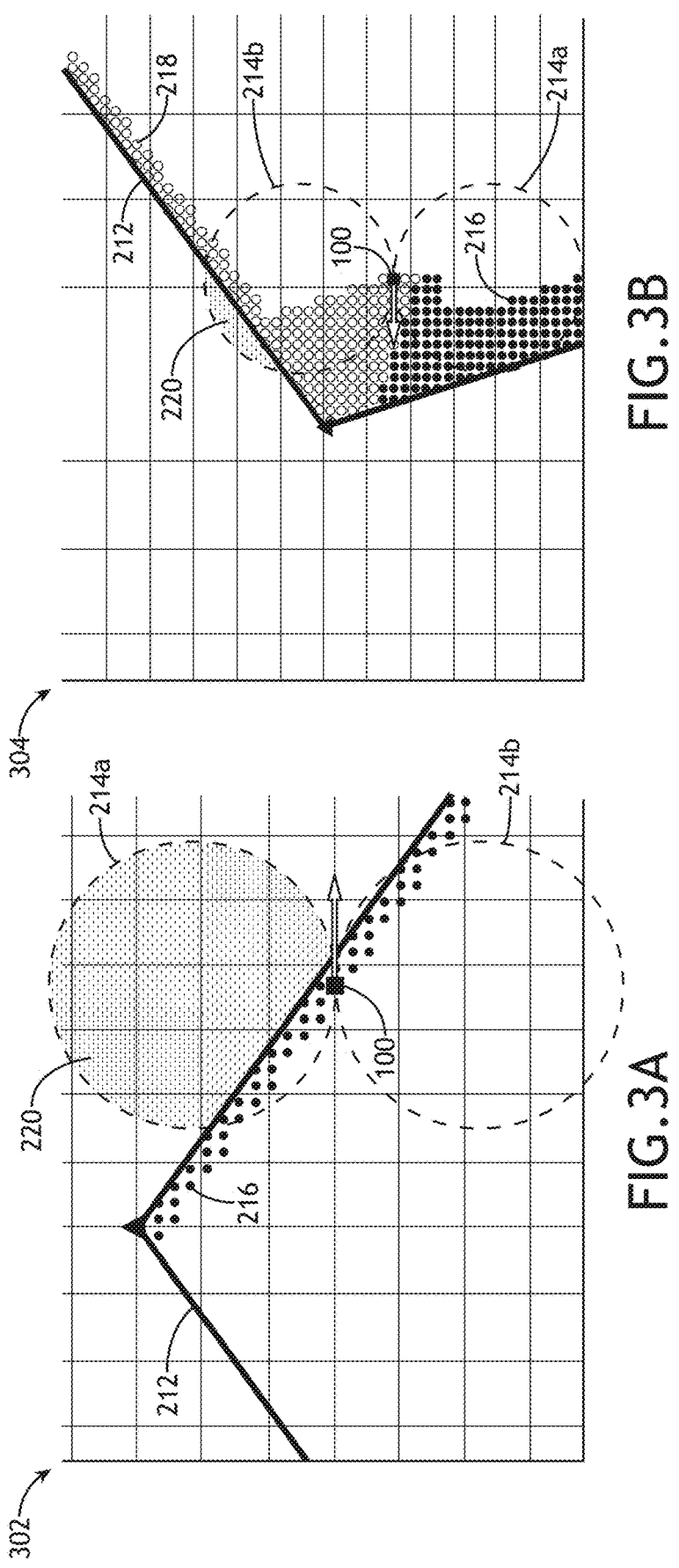

FIG. 3A illustrates a diagrammatic view 302 of the AV 100 flying east (i.e., right) and taking a maximum bank right fallback action.

FIG. 3B illustrates a diagrammatic view 304 of the AV 100 is flying west (i.e., left) and taking a maximum bank left fallback action.

Figures 3C, 3D:
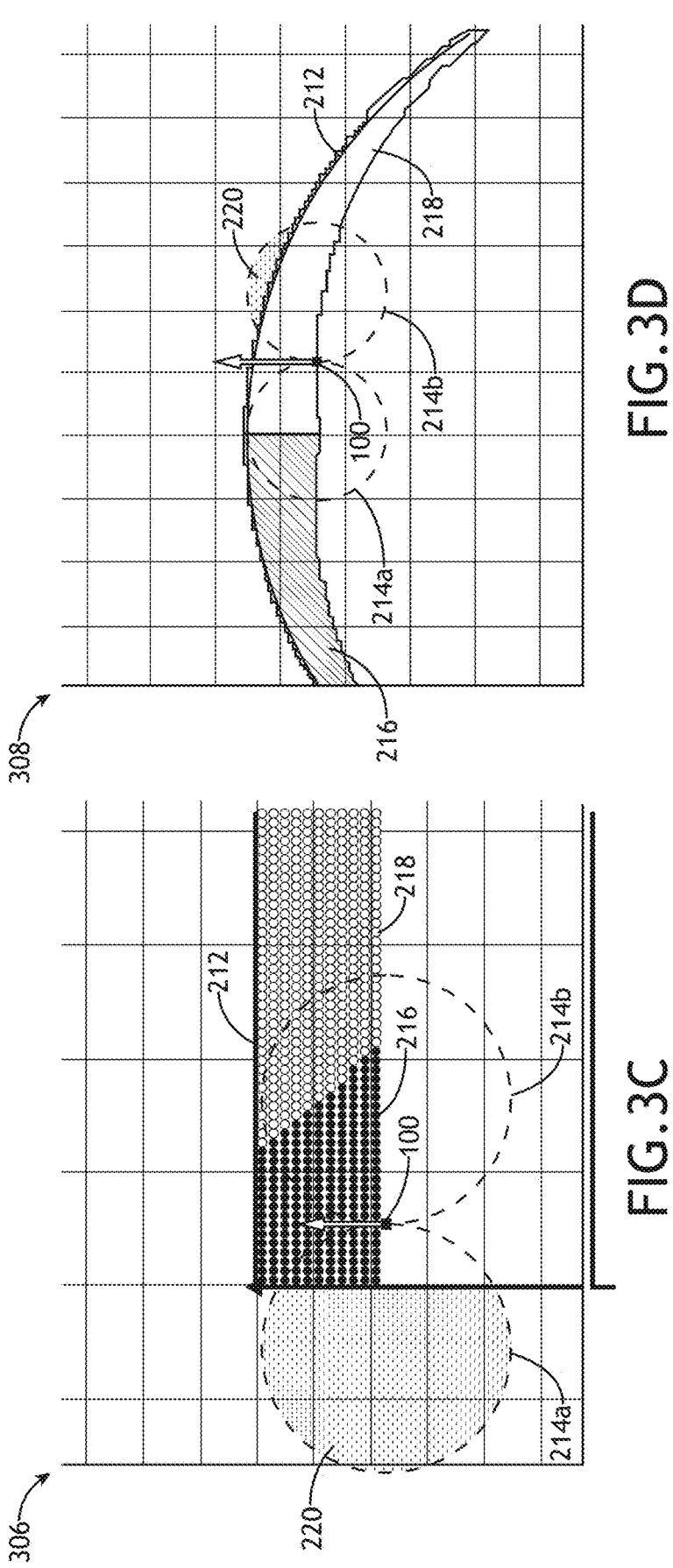

FIG. 3C illustrates a diagrammatic view 306 of the AV 100 is flying north and taking a maximum bank right fallback action.

FIG. 3D illustrates a diagrammatic view 308 of the AV 100 flying north and taking a maximum bank left fallback action. It is noted that the robustness of at least some embodiments of the present disclosure is illustrated by the variety of perimeter 212 shapes (e.g., curves, convex angle, concave angles, polygons, non-angled perimeters, and the like) that can be adequately handled without a result in a violation (e.g., entering undesired airspace). Note that it is contemplated that embodiments of the present disclosure may also similarly handle a variety of 3-dimensional shapes/perimeters using 3-dimensional boundaries 214 (not shown).

Note that just because a boundary is violated does not mean that an undesired condition will necessarily be met because, as discussed throughout, the boundaries 214 may include an added safety margin such that an initial boundary violation determination still allows clearance to perform a fallback action without an undesired condition (e.g., collision, undesired airspace entering) from occurring.

Figures 4A, 4B:
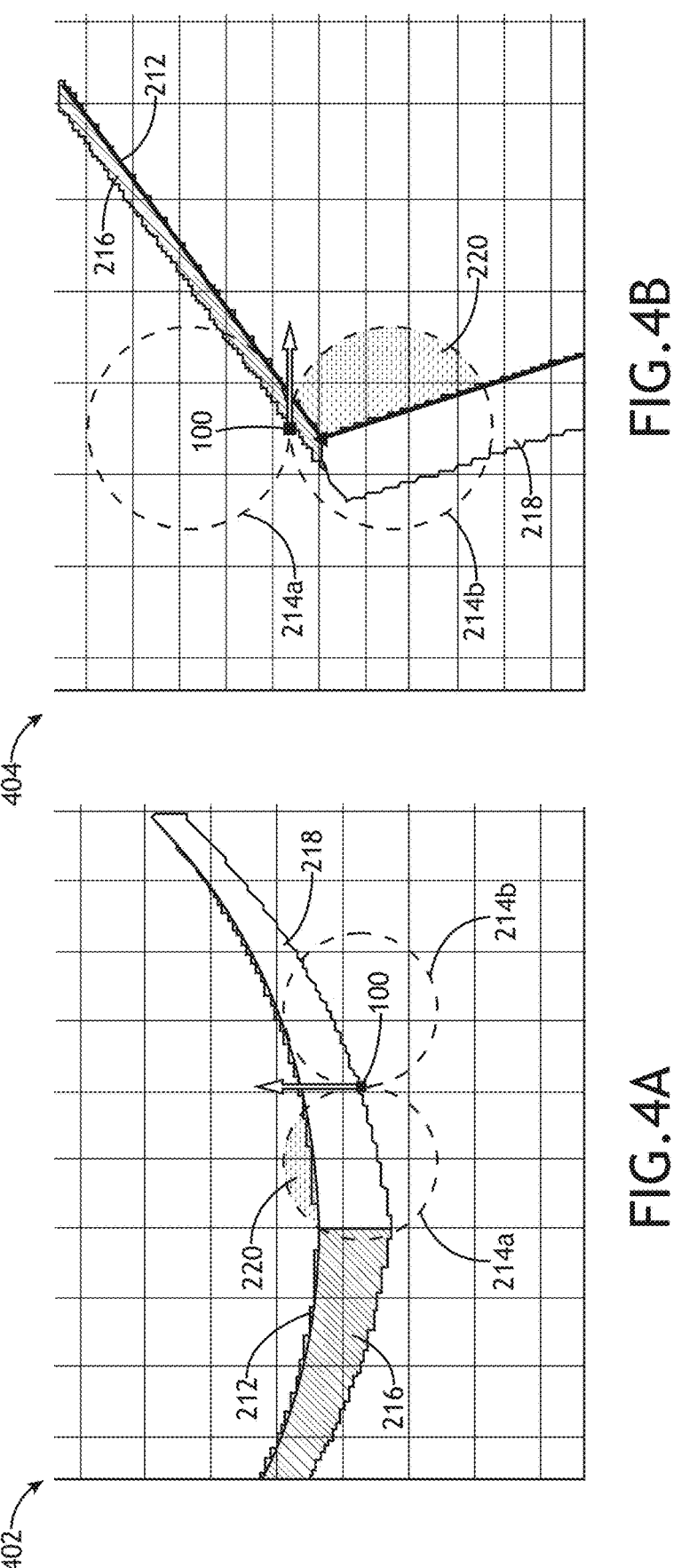

FIGS. 4A-4B illustrate top-down diagrammatic views 402, 404 of an AV 100 with integrity monitoring in the context of a keep-out zone (e.g., keep-out zone perimeter 212). In FIG. 4A the AV 100 is flying north and takes a maximum bank right fallback action. In FIG. 4B the AV 100 is flying east and takes a maximum bank left fallback action.

It should be noted that while the figures and descriptions herein may only illustrate one or more perimeters 212 (e.g., zones, obstacles 144), at least some embodiments allow for multiple simultaneous and overlapping perimeters 212. For example, multiple simultaneous and overlapping perimeters 212 may be handled by considering the union of all perimeters 212. This approach may provide benefits over other techniques that may only prioritize the most imminent perimeters 212 and end up steering a vehicle into a state where it is impossible to avoid other approaching zones.

Figure 5:
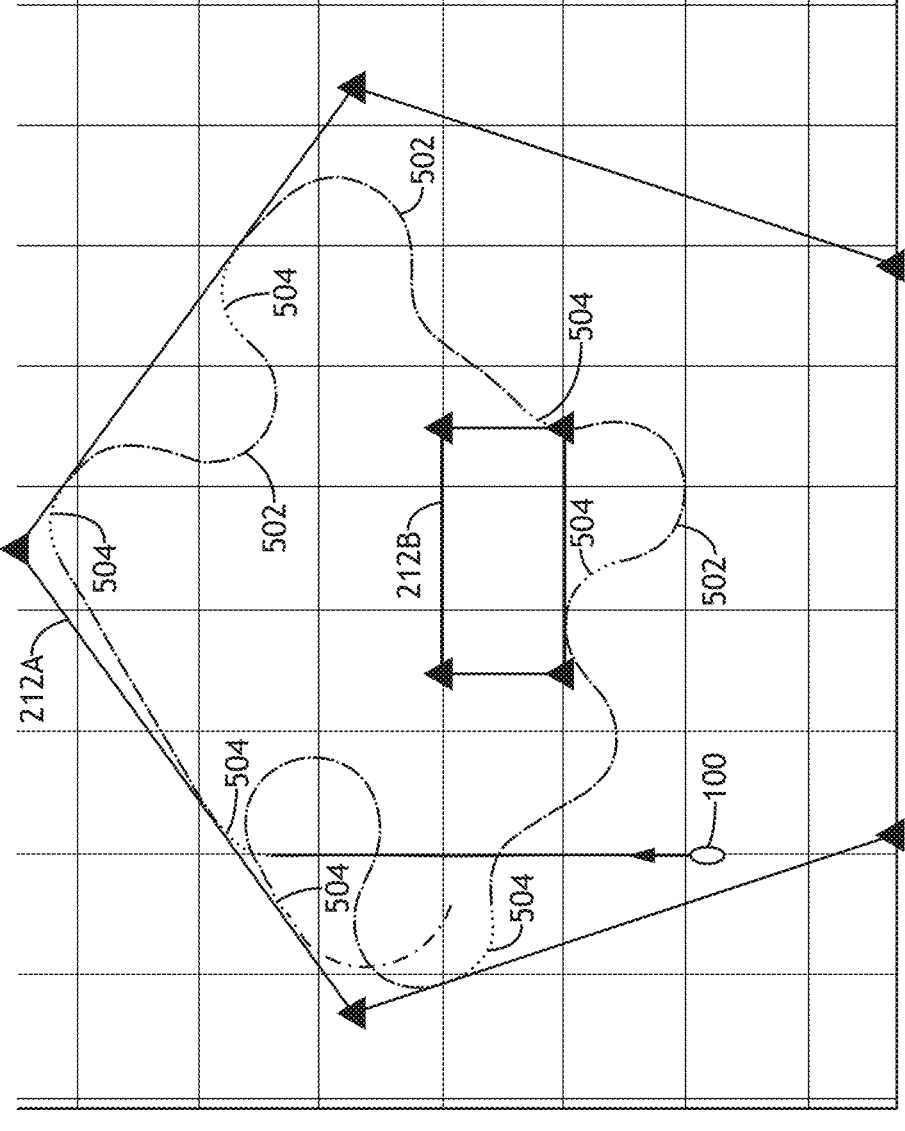
FIG. 5 illustrates a top-down diagrammatic view of a path of an autonomous vehicle with integrity monitoring, in accordance with one or more embodiments of the present disclosure.

FIG. 5 illustrates a top-down diagrammatic view of a trajectory 502,504 (e.g., path) of an AV 100 with integrity monitoring, in accordance with one or more embodiments of the present disclosure. The trajectory 502,504 is shown in the context of a keep-in perimeter 212A (i.e., the inside rectangular box) and a keep-out perimeter 212B (i.e., the outer pentagon).

The AV 100 is shown at the start of the trajectory 502,504 heading north (e.g., up). Control trajectory 502 shows the portions of the trajectory when the AV 100 is controlled by a primary control output of a primary module 104, while override trajectory 504 shows portions of the trajectory when the monitor module 102 overrode the primary control output to perform at least one of a maximum bank left fallback action or a maximum bank right fallback action.

As shown, when the AV 100 approaches the keep-in perimeter 212A, the AV 100 perform a right bank fallback action at just the right moment to avoid crossing the keep-in perimeter 212A. This shows the tight confidence and reliability of at least some embodiments. As shown, the monitor module 102 does not "latch" (e.g., maintain control always). In this regard, the monitor module 102 may repeatedly override and then return control to the primary module 104. Note that, in some embodiments, the AV 100 with integrity monitoring may maintain a close proximity with a perimeter over time (e.g., "riding the rails").

Referring back to system 10 generally, in some embodiments, the process of generating one or more boundary violation determinations, acquiring one or more boundaries 214 and/or any other step or combination of steps in this disclosure may be performed iteratively (e.g., up to 10 Hz or 20 Hz if the AV 100 doesn't maneuver aggressively/quickly, or otherwise up to 50 Hz or 100 Hz).

FIG. 6 illustrates a flowchart of a method 600 for integrity monitoring, in accordance with one or more embodiments of the present disclosure.

It should be noted that various embodiments of system 10 may be implemented to perform one or more of the following steps of method 600 and various embodiments, examples, and elements of system 10 may be understood to be described by the following non-limiting disclosure related to method 600. For example, the system may include one or more controllers 138 including one or more processors 142 configured to execute a set of program instructions stored in a memory 140, the set of program instructions configured to cause the one or more processors 142 to perform one or more of the steps of method 600.

In a step 602, one or more boundaries 214 are acquired, each boundary 214 of the one or more boundaries 214 based on at least one fallback action of one or more fallback actions.

In a step 604, situational data is received, the situational data comprising at least one of environmental data or autonomous vehicle data.

In a step 606, one or more boundary violation 220 determinations are generated using a monitor module 102 configured to monitor an AV 100.

In a step 608, a fallback status based on at least the one or more boundary violation determinations is generated. The fallback status being configured to correspond to a determination of whether to override a primary control output, the primary control output configured to be used to control the AV 100.

In an optional step, the AV 100 is controlled based on at least the fallback status 124. In one example, the fallback status is indicative of a positive determination to take control (override) the primary control output, then the primary control output of the primary module 104 of the AV 100 may be overridden (e.g., one or more outputs/controls/actions may be generated that are configured to control the AV 100 and/or a fallback action of the set of fallback actions may be configured and used to control the AV 100). For instance, if there is only one remaining fallback action that can safely be performed, the controller 138 (or method 300) may cause an action corresponding/related/similar to that fallback action to be performed by the AV 100.

It should be noted that real world vehicle dynamics as are analyzed to determine vehicle trajectories 222 under a variety of parameter values (e.g., wind speeds, air pressures, etc.) may be complex and difficult to simulate (e.g., computationally expensive). Generally, some approaches to solving for trajectories 222 by analyzing vehicle dynamics use nonlinear model predictive control (NMPC) where a cost function is minimized across a predicted forward time horizon, subject to the vehicle dynamics and the zone/obstacle perimeter 212 constraints. Implementing NMPC in real time may cause a number of issues including a need for nonlinear nonconvex optimizers, handling problems of non-uniqueness or non-existence of solutions, choosing a length of forward time (to simulate), numerical stability/instability, high computational complexity, and other issues that often plague NMPC in real-time contexts.

At least some of these issues are addressed by at least some embodiments of the present disclosure.

For example, at least one embodiment is performed as is described below. Offline, pre-determined and validated model of system dynamics may be utilized to run forward simulations of maximum performance trajectories 222 (e.g., escapes, turns, and the like) over a discretized grid of states that represent starting conditions of the escape maneuver (e.g., starting velocity, bank angle, and/or the like). In some examples, symmetry may be exploited to assume symmetric results about a symmetric axis/plane to reduce the number of computations needed.

Such trajectories 222 may be over-bound (increased in size) to nearest fitting shapes/functions (e.g., ellipses, circles, and the like) that encapsulate the entire trajectory (or trajectories) 222, where such shapes/functions are the boundaries 214. In some instances, the dimensions (e.g., radii) of the boundaries 214 (e.g., ellipse shapes) are inflated to account for any known uncertainty in the modelled vehicle dynamics (e.g., where an uncertainty example is a wind speed having a confidence interval (CI) (e.g., 95% CI at 5 m/s plus or minus 1 m/s)), resulting in inflated boundaries 214. Such inflated boundaries 214 may be stored in a dataset (e.g., as a lookup table). For example, associated code for looking up (acquiring) boundaries 214 from such a database may be "ellipse_params=lkup(starting_vel, starting_bank, . . . )" (or similar code) such that a boundary 214 associated with such parameter values of starting velocity and starting bank angle may be looked up (acquired). The dataset may be stored in memory 140. Next, during actual flight in real time, such a boundary (e.g., boundary having ellipse dimensions) may be acquired from the database.

In some embodiments, the boundaries 214 (e.g., shapes of boundaries, dimensions of boundaries, radii of boundaries, and/or the like) may be inflated to account for system error. For example, to account for over-bound of the vehicle's trajectory due to system error. For example, system error may be a total system error budget. For instance, the radii of an ellipse of a boundary 214 could be increased to account for expected flight technical error (FTE) of the pilot or autopilot in performing a fallback action (e.g., if not accurately simulated/modelled in offline simulations). In this regard, simulation error may be accounted for. Further, system error may also, or alternatively, include current navigation system error (e.g., error in GPS location), and/or any other errors or reasons to increase conservativeness into the system error. In this regard, a margin of safety (i.e., additional margin) may be introduced. It should be noted that this additional margin may be smaller in distance/inflation than a margin of safety calculated offline because, in some embodiments, the dataset may be used to dynamically account for more accurate parameters (e.g., actual wind speeds measured around the AV 100 in real time).

In some examples, a boundary 214 (e.g., the inflated boundary 214 discussed above) is compared to an internal representation of perimeters 212 (e.g., zone perimeters and/or obstacles 144) to generate a boundary violation 220 determination. For example, if a sensor generates situational data of an obstacle (e.g., radar measurement of distance and relative location of the obstacle to the AV 100) and/or an AV location (e.g., GPS location of AV 100), then a boundary 214 of the AV 100 may computationally be compared to such a perimeter 212 to determine if the boundary 214 and the perimeter 212 intersect.

In at least some embodiments, benefits include high integrity over-bounding and intuitive concept of operation and understanding of the AV's 100 limitations (e.g., as limited by the boundaries 214).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain module or group of modules. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for integrity monitoring during a flight of an autonomous vehicle, the system comprising:
 one or more wireless communication devices configured for remote communication;
 one or more sensors configured to be used on the autonomous vehicle to receive situational data comprising environmental data and autonomous vehicle data; and
 one or more controllers comprising one or more processors configured to execute a set of program instructions stored in a memory, the set of program instructions configured to cause the one or more processors to:
  acquire, in real time, one or more boundaries defined relative to the autonomous vehicle from a multidimensional dataset comprising a lookup table comprising the one or more boundaries, wherein the acquiring is based on one or more determined values of one or more parameters, wherein each boundary encapsulates one or more pre-determined simulated trajectories of a path of the autonomous vehicle, wherein each boundary defines a space for the autonomous vehicle to perform the one or more pre-determined simulated trajectories and is based on at least one fallback action of one or more fallback actions, wherein each fallback action comprises an aircraft maneuver of the autonomous vehicle, and wherein each boundary is based on a fallback boundary and an additional margin;

receive the situational data comprising the environmental data and the autonomous vehicle data;

generate, in real time during the flight of the autonomous vehicle, using a monitor module configured to monitor the autonomous vehicle, one or more boundary violation determinations indicative of an intersection of at least one of an obstacle or a zone with a boundary of the one or more boundaries and an inability to perform a particular fallback action corresponding to the boundary;

generate, in real time during the flight of the autonomous vehicle, a fallback status based on at least the one or more boundary violation determinations, the fallback status being configured to correspond to a determination to override a primary control output, the primary control output configured to be used to control the autonomous vehicle; and control, based on at least the fallback status, the autonomous vehicle to perform the aircraft maneuver of the fallback action.

2. The system of claim 1, each boundary of the one or more boundaries being based on a simulated performance of the autonomous vehicle performing a fallback action under one or more simulated values of the one or more parameters.

3. The system of claim 1, the one or more parameters comprising at least one of velocity, or bank angle.

4. The system of claim 1, the at least one fallback action comprising at least one of a bank left fallback action or a bank right fallback action.

5. The system of claim 1, the set of program instructions further configured to cause the one or more processors to:

inflate each boundary of the one or more boundaries based on one or more inflation parameters.

6. The system of claim 5, the one or more inflation parameters comprising an expected flight error parameter.

7. A method for integrity monitoring during a flight of an autonomous vehicle, the method comprising:

acquiring, in real time, one or more boundaries defined relative to the autonomous vehicle from a multi-dimensional dataset comprising a lookup table comprising the one or more boundaries, wherein the acquiring is based on one or more determined values of one or more parameters, wherein each boundary encapsulates one or more pre-determined simulated trajectories of a path of the autonomous vehicle, wherein each boundary defines a space for the autonomous vehicle to perform the one or more pre-determined simulated trajectories and is based on at least one fallback action of one or more fallback actions, wherein each fallback action comprises an aircraft maneuver of the autonomous vehicle, and wherein each boundary is based on a fallback boundary and an additional margin;

receiving situational data comprising environmental data and autonomous vehicle data, wherein the receiving the situational data is received using one or more sensors on the autonomous vehicle;

generating, in real time during the flight of the autonomous vehicle, using a monitor module configured to monitor the autonomous vehicle, one or more boundary violation determinations indicative of an intersection of at least one of an obstacle or a zone with a boundary of the one or more boundaries and an inability to perform a particular fallback action corresponding to the boundary;

generating, in real time during the flight of the autonomous vehicle, a fallback status based on at least the one or more boundary violation determinations, the fallback status being configured to correspond to a determination to override a primary control output, the primary control output configured to be used to control the autonomous vehicle; and controlling, based on at least the fallback status, the autonomous vehicle to perform the aircraft maneuver of the fallback action.

8. The method of claim 7, each boundary of the one or more boundaries being based on a simulated performance of the autonomous vehicle performing a fallback action under one or more simulated values of the one or more parameters.

9. The method of claim 7, the one or more parameters comprising at least one of velocity, or bank angle.

10. The method of claim 7, the at least one fallback action comprising at least one of a bank left fallback action or a bank right fallback action.

11. The method of claim 7, the method further comprising:

inflating each boundary of the one or more boundaries based on one or more inflation parameters.

12. The method of claim 11, the one or more inflation parameters comprising an expected flight error parameter.

* * * * *